June 26, 1962　　　JIRO MUKAI　　　3,040,624

WIDE ANGLE PHOTOGRAPHIC OBJECTIVE

Filed Aug. 7, 1957

SPHERICAL ABERRATION
DEVIATION FROM SINE
CONDITION

ASTIGMATIC ABERRATION

DISTORTION

INVENTOR.
JIRO MUKAI
BY
ATTORNEY

United States Patent Office 3,040,624
Patented June 26, 1962

3,040,624
WIDE ANGLE PHOTOGRAPHIC OBJECTIVE
Jiro Mukai, Kohokuku, Yokohama City, Japan, assignor to Canon Camera Company, Inc., Tokyo, Japan, a corporation of Japan
Filed Aug. 7, 1957, Ser. No. 676,782
Claims priority, application Japan Oct. 27, 1956
1 Claim. (Cl. 88—57)

The present invention relates to wide angle photographic objectives and more particularly high aperture wide angle photographic objectives.

It is an object of the present invention to provide a high aperture photographic objective with a relatively long back focal length in comparison with its effective focal length.

It is another object of the present invention to provide a wide angle photographic objective highly corrected for spherical, astigmatic and chromatic aberrations, as also for coma and distortion.

Figure 1:
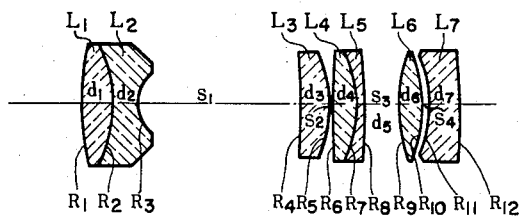
Figure 2:
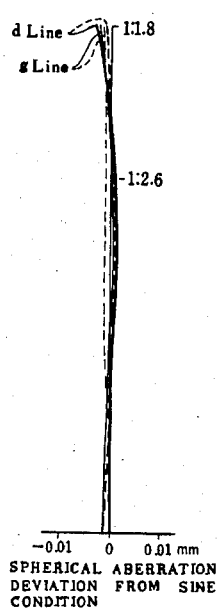
Figure 3:
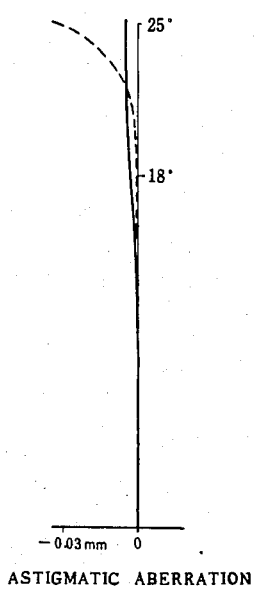
Figure 4:
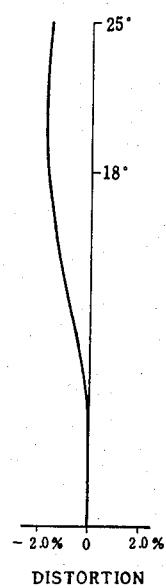

A clearer concept of the scope and purpose of the present invention may be obtained from the following description taken in connection with the attached drawing, in which:

FIG. 1 is a sectional view of a wide angle photographic objective having an image field of 50° and an aperture ratio of 1:1.8 according to the present invention, and FIGS. 2, 3 and 4 are diagrams showing spherical aberration, astigmatic aberration and distortion, respectively, of said photographic objective.

A wide angle photographic objective according to the present invention comprises four axially aligned and air spaced components consisting of seven lenses.

The first component is a negative meniscus comprising a front biconvex positive lens $L_1$ and a rear biconcave negative lens $L_2$ cemented together with the cemented surface having a converging power. The second component is a single positive lens $L_3$ with its stronger convex surface towards the image, while the third component is a positive biconvex lens comprising a front biconvex positive lens $L_4$ and a rear meniscus shaped concave negative lens $L_5$ cemented together and axially aligned with the second component with its strongly curved diverging cemented surface convex towards the image, and the fourth component is a positive lens comprising a front biconvex positive lens $L_6$ and a rear negative lens $L_7$ air spaced from the front lens $L_6$ with a relatively small distance therebetween.

Calculations and practical tests made by the applicant have proved that the thus constituted objective had to meet the following conditions:

(1) $0.1 < N_1 - N_2 < 0.2$, $8 < R_1/R_3 < \infty$, $0.5F < d_1 + d_2 < 1.2F$
(2) $1.0F < |R_2| < 3F$
(3) $1.4F < s_1 < 3.4F$, $0.2F < s_3 < 0.8F$, $0.04F < s_4 < 0.12F$ (4) $$1.6 < \frac{N_4 + N_5 + N_6 + N_7}{4} < 1.8$$

(5) $0.2F < d_7 < 0.6F$ wherein the radii R, the lens thicknesses $d$, the spaces S, the refractive indices N for the $d$-line of the spectrum, and the Abbe numbers V for the respective lenses are respectively numbered by subscripts in the order of from front to rear of the objective, and F is the effective focal length of the whole optical array.

The following shows a practical embodiment of the photographic objective according to the present invention.

[F=1   f:1.8   2a=50°]

| | | | |
|---|---|---|---|
| $R_1=8.557$ | $d_1=0.482$ | $N_1=1.6645$ | $v_1=35.9$ |
| $R_2=-1.720$ | $d_2=0.422$ | $N_2=1.5101$ | $v_2=63.4$ |
| $R_3=0.751$ | $s_1=2.405$ | | |
| $R_4=-31.557$ | $d_3=0.432$ | $N_3=1.6583$ | $v_3=57.29$ |
| $R_5=-1.969$ | $s_2=0.008$ | | |
| $R_6=13.709$ | $d_4=0.432$ | $N_4=1.6088$ | $v_4=58.9$ |
| $R_7=-1.763$ | $d_5=0.137$ | $N_5=1.7552$ | $v_5=27.5$ |
| $R_8=-8.400$ | $s_3=0.495$ | | |
| $R_9=2.329$ | $d_6=0.417$ | $N_6=1.7200$ | $v_6=50.31$ |
| $R_{10}=-2.032$ | $s_4=0.082$ | | |
| $R_{11}=-1.625$ | $d_7=0.445$ | $N_7=1.7552$ | $v_7=27.5$ |
| $R_{12}=-5.113$ | | | |

The condition of spherical aberration, astigmatic aberration and distortion relating to the above mentioned embodiment according to the present invention is illustrated in FIGS. 2, 3 and 4, respectively.

A photographic objective comprising a first component of a strongly diverging negative lens, as has the objective according to the present invention, is generally called an inversed telephoto type and has a particular characteristic of a relatively long back focal length as compared with its focal length. It is obvious, however, that it has the unavoidable disadvantage that image curvature and distortion are apt to be introduced due to the presence of a strongly curved negative lens as the first component. It is a particular object of the present invention in a wide angle photographic objective of the inversed telephoto type to reduce image curvature and distortion to the conceivable minimum while providing a relatively high aperture. It is apparent therefore that a decisively effective requirement is the selection for lens $L_1$ of an optical glass having a refractive index of from 0.1 to 0.2 greater than that of the optical glass of lens $L_2$ and, furthermore, to correct distortion satisfactorily by selecting the axial thickness of the lens elements $L_1$ and $L_2$ of the first component at the optical axis of a value between 0.5F and 1.2F and making the absolute value of the radius of curvature of the cemented surface of a value between 1.3F and 3F. It is another advantage in the efficient correction for image curvature that the ratio between the radius of curvature of the refractive surface on the side of the object of the first component and the radius of curvature of the refractive surface towards the image is made of a value between 8 and infinity and furthermore the axial thickness at the optical axis of the first component is made of a value between 0.5F and 1.2F. It should be noted that a zonal spherical aberration may be caused in a photographic objective of an inversed telephoto type due to the presence of the positive lenses of the third and fourth components. It is a further advantage of the present invention that correction for spherical aberration is efficiently obtained made by selecting the refractive indices of each lens $L_3$, $L_4$, $L_5$, $L_6$ and $L_7$ of a higher value between 1.6 and 1.8, and by reducing the radius of curvature of the refractive surface of each lens element. By the cooperating effect of the above mentioned conditions the present invention offers a remarkably efficient and highly corrected high aperture wide angle photographic objective having a relatively long back focal length.

What is claimed is:
A wide angle photographic objective comprising four aligned air spaced components of a total of seven lenses having the following numerical data:

[F=1.0   f:1.8   2α=50°]

| Lens | Radius of Curvature | Thickness and Spacing | Refractive Index | Abbe Number |
|---|---|---|---|---|
| $L_1$ | $R_1 = 8.557$ | $d_1 = 0.482$ | $N_1 = 1.6645$ | $V_1 = 35.9$ |
|  | $R_2 = -1.720$ |  |  |  |
| $L_2$ | $R_3 = 0.751$ | $d_2 = 0.422$ | $N_2 = 1.5101$ | $V_2 = 63.4$ |
|  |  | $s_1 = 2.405$ |  |  |
| $L_3$ | $R_4 = -31.557$ | $d_3 = 0.432$ | $N_3 = 1.6583$ | $V_3 = 57.29$ |
|  | $R_5 = -1.969$ |  |  |  |
|  |  | $s_2 = 0.008$ |  |  |
|  | $R_6 = 13.709$ |  |  |  |
| $L_4$ |  | $d_4 = 0.432$ | $N_4 = 1.6088$ | $V_4 = 58.9$ |
|  | $R_7 = -1.763$ |  |  |  |
| $L_5$ | $R_8 = -8.400$ | $d_5 = 0.137$ | $N_5 = 1.7552$ | $V_5 = 27.5$ |
|  |  | $s_3 = 0.495$ |  |  |
|  | $R_9 = 2.329$ |  |  |  |
| $L_6$ | $R_{10} = -2.032$ | $d_6 = 0.417$ | $N_6 = 1.7200$ | $V_6 = 50.31$ |
|  |  | $s_4 = 0.082$ |  |  |
|  | $R_{11} = -1.625$ |  |  |  |
| $L_7$ | $R_{12} = -5.113$ | $d_7 = 0.445$ | $N_7 = 1.7552$ | $V_7 = 27.5$ | where the lens L, the radius R, the lens thickness $d$ at the optical axis, the space $s$ between lenses, the refractive index N for the $d$-line of the spectrum, and the Abbe number V of the optical glass, has a subscript increasing in the order from the object side to the image side of the objective.

References Cited in the file of this patent
UNITED STATES PATENTS

| | | |
|---|---|---|
| 560,460 | Aldis | May 19, 1896 |
| 1,085,868 | König | Feb. 3, 1914 |
| 1,791,276 | König | Feb. 3, 1931 |
| 2,341,385 | Kingslake | Feb. 8, 1944 |
| 2,382,669 | Schade | Aug. 14, 1945 |
| 2,413,476 | Warmisham | Dec. 31, 1946 |
| 2,594,021 | Hopkins et al. | Apr. 22, 1952 |
| 2,696,758 | Augenieux | Dec. 14, 1954 |
| 2,826,117 | Mukai | Mar. 11, 1958 |